United States Patent
Zhao

(10) Patent No.: US 8,781,517 B2
(45) Date of Patent: Jul. 15, 2014

(54) METHOD FOR CELL SLEEP/WAKEUP, METHOD AND APPARATUS FOR CONTROLLING CARRIER POWER

(75) Inventor: Jie Zhao, Shenzhen (CN)

(73) Assignee: ZTE Corporation, Shenzhen (CN)

(*) Notice: Subject to any disclaimer, the term of this patent is extended or adjusted under 35 U.S.C. 154(b) by 318 days.

(21) Appl. No.: 13/258,387

(22) PCT Filed: Apr. 22, 2010

(86) PCT No.: PCT/CN2010/072044
§ 371 (c)(1),
(2), (4) Date: Sep. 21, 2011

(87) PCT Pub. No.: WO2010/121554
PCT Pub. Date: Oct. 28, 2010

(65) Prior Publication Data
US 2012/0028674 A1    Feb. 2, 2012

(30) Foreign Application Priority Data
Apr. 23, 2009  (CN) .......................... 2009 1 0137213

(51) Int. Cl.
*H04W 52/54*  (2009.01)

(52) U.S. Cl.
USPC ............. 455/522; 455/69; 455/517; 455/13.4

(58) Field of Classification Search
USPC ........ 455/69, 522, 517, 503, 502, 446, 127.5, 455/343.2, 418, 414.1, 550.1, 450, 464, 455/440, 438, 444, 68, 561, 436, 456.6; 370/254, 252, 330, 311, 260, 331, 322, 370/321, 326
See application file for complete search history.

(56) References Cited

U.S. PATENT DOCUMENTS 6,178,334 B1 * 1/2001 Shyy et al. .................... 455/503
7,567,791 B2 * 7/2009 Laroia et al. ............... 455/343.2
(Continued)

FOREIGN PATENT DOCUMENTS

CN   101364910 A   2/2009
EP   2180640 A1    4/2010
(Continued)

OTHER PUBLICATIONS

R3-081281, "Issues and Enhanced Framework for the Energy Saving Use Case," Nokia Siemens Networks, Nokia, (May 5-9, 2008).
(Continued)

*Primary Examiner* — Tan Trinh
(74) *Attorney, Agent, or Firm* — Joseph Hyosuk Kim; JHK Law

(57) ABSTRACT

The present invention discloses a method for cell sleep/wakeup, and a method and an apparatus for controlling carrier power, wherein the method for controlling carrier power comprises: a SON judging whether a cell of a base station requires sleep and/or wakeup, wherein when the judgment result is that the cell requires sleep, the SON indicates the base station to make the cell to sleep, so that the base station reduces pilot channel power of a carrier of the cell to zero or closes the carrier to make the cell enter an energy-saving state; and when the judgment result is that the cell requires wakeup, the SON indicates the base station to wake up the cell, so that the base station recovers the pilot channel power of the carrier of the cell to an operation state value to make the cell exit the energy-saving state.

11 Claims, 4 Drawing Sheets

(56) References Cited

U.S. PATENT DOCUMENTS

| | | | |
|---|---|---|---|
| 7,756,548 B2* | 7/2010 | Laroia et al. | 455/561 |
| 8,160,589 B2* | 4/2012 | Kuwahara | 455/440 |
| 8,265,033 B2* | 9/2012 | Gunnarsson et al. | 370/331 |
| 8,340,703 B2* | 12/2012 | Laroia et al. | 455/502 |
| 8,447,368 B2* | 5/2013 | Zettler et al. | 455/574 |
| 8,477,681 B2* | 7/2013 | Cheng | 370/322 |
| 2007/0066273 A1* | 3/2007 | Laroia et al. | 455/343.2 |
| 2007/0066329 A1* | 3/2007 | Laroia et al. | 455/502 |
| 2008/0253327 A1* | 10/2008 | Kohvakka et al. | 370/330 |
| 2009/0047956 A1* | 2/2009 | Moe et al. | 455/436 |
| 2010/0002603 A1* | 1/2010 | Gupta et al. | 370/254 |
| 2010/0002614 A1* | 1/2010 | Subrahmanya | 370/311 |
| 2010/0106989 A1* | 4/2010 | Chen | 713/322 |
| 2010/0135248 A1* | 6/2010 | Aramaki et al. | 370/331 |
| 2010/0232318 A1* | 9/2010 | Sarkar | 370/254 |
| 2010/0317374 A1* | 12/2010 | Alpert et al. | 455/458 |
| 2011/0085611 A1* | 4/2011 | Laroia et al. | 375/260 |
| 2012/0106423 A1* | 5/2012 | Nylander et al. | 370/311 |

FOREIGN PATENT DOCUMENTS

| | | |
|---|---|---|
| JP | 200337555 A | 2/2003 |
| JP | 2006352477 A | 12/2006 |

OTHER PUBLICATIONS

R3-081174, "Solutions for interference reduction SON use case," Orange, Alcatel-Lucent, (May 5-9, 2008).

* cited by examiner

METHOD FOR CELL SLEEP/WAKEUP, METHOD AND APPARATUS FOR CONTROLLING CARRIER POWER

CROSS-REFERENCE TO RELATED APPLICATIONS

This application is a National Phase application, filed under 35 U.S.C. §371, of PCT Application No. PCT/CN2010/072044, filed Apr. 22, 2010, which claims the benefit of priority to Chinese Patent Application No. 200910137213.8, filed on Apr. 23, 2009, the contents of which are incorporated herein by reference in their entirety.

FIELD OF THE INVENTION

The present invention relates to the communication field, and in particular to a method for cell sleep/wakeup, a method and an apparatus for controlling carrier power.

BACKGROUND OF THE INVENTION

Currently, the telecommunication industry gradually enters meager profit phase. Telecommunication operators pay more attention to cost-reducing sectors such as saving energy and the like while seeking to enlarge market share and increase service type revenue. As the main energy-consuming part for the operators, the base stations are considered as the key of energy-saving. At the same time, the ordinary people also pay more attention to the problem that the base stations in operation cause electromagnetic wave radiation pollution.

Currently, the energy-saving of a base station is mainly achieved by means of using new energy-saving and environment-friendly devices and improving the heat dissipation material, which reduces the power consumption of the base station and at the same time reduces the power consumption brought by the heat dissipation. However, this technology has the following problems: increasing the manufacture costs of the base station by using such devices and at the same time a large amount of base stations which do not use such devices can not achieve the purpose of energy-saving.

The Self Organizing Network (abbreviated as SON) is a key object of the Radio Access Network (abbreviated as RAN) of the Long Term Evolution (abbreviated as LTE) system. Functions of the SON include Self Configuring function and Self Optimizing function. Hereinafter, SON represents a logic entity which achieves the functions of the SON, which can be implemented on a base station or implemented in a network management system.

Aiming at the problem that relatively high costs is caused by adding hardware devices to achieve the energy-saving of a base station in the prior art, no effective solution has been proposed so far.

SUMMARY OF THE INVENTION

The present invention is proposed aiming at relatively high costs is caused by adding hardware devices to achieve the energy-saving of a base station in the prior art, therefore the main aspect of the present invention is to provide an improved solution for cell sleep/wakeup and a solution for controlling carrier power, so as to solve the above problem.

In order to achieve the above aspect, a method for cell sleep is provided according to an aspect of the present invention.

The method for cell sleep according to the present invention comprises: a Self Organizing Network (SON) judging whether a cell of a base station requires sleep, wherein when the judgment result is that the cell requires sleep, the Self Organizing Network indicates the base station to make the cell to sleep.

Preferably, after the Self Organizing Network indicates the base station to make the cell to sleep, the method further comprises: the base station making the cell to sleep by one of the following manners: the base station immediately closing transmission power of the cell; and the base station gradually reducing the transmission power of the cell and closing the transmission power of the cell after users in the cell migrate to other cells; and the base station returning a process result to the Self Organizing Network.

Preferably, the Self Organizing Network judges whether the cell of the base station requires sleep according to at least one of the following: load condition of a serving cell and an adjacent cell, the number of attempts of soft handover, and a fixed time period.

Preferably, the Self Organizing Network judges whether the cell of the base station requires sleep by a periodical manner or an event triggering manner.

In order to achieve the above aspect, a method for cell wakeup is also provided according to an aspect of the present invention.

The method for cell wakeup according to the present invention comprises: a Self Organizing Network judging whether a cell of a base station requires wakeup, wherein when the judgment result is that the cell requires wakeup, the Self Organizing Network indicates the base station to wake up the cell.

Preferably, after the Self Organizing Network indicates the base station to wake up the cell, the method further comprises: the base station receiving indication information from the Self Organizing Network, wherein the indication information is adapted to indicate the base station to wake up the cell; the base station recovering the cell to be an operation state; and the base station returning a process result to the Self Organizing Network.

Preferably, the Self Organizing Network judges whether the cell of the base station requires wakeup according to at least one of the following: load condition of a serving cell and an adjacent cell, the number of attempts of soft handover, and a fixed time period.

Preferably, the Self Organizing Network judges whether the cell of the base station requires wakeup by a periodical manner or an event triggering manner.

Preferably, the base station recovering the cell to the operation state comprises the following manner: the base station recovering pilot channel power of a carrier of the cell to an operation state value.

In order to achieve the above aspect, a method for controlling carrier power is provided according to another aspect of the present invention.

The method for controlling carrier power according to the present invention comprises: a Self Organizing Network judging whether a cell of a base station requires sleep and/or wakeup, wherein when the judgment result is that the cell requires sleep, the Self Organizing Network indicates the base station to make the cell to sleep, so that the base station reduces pilot channel power of a carrier of the cell to zero or closes the carrier, to make the cell to enter an energy-saving state; and when the judgment result is that the cell requires wakeup, the Self Organizing Network indicates the base station to wake up the cell, so that the base station recovers the pilot channel power of the carrier of the cell to an operation state value, to make the cell to exit the energy-saving state.

Preferably, the base station making the cell to sleep includes: the base station immediately closing transmission power of the cell.

Preferably, the base station making the cell to sleep includes: the base station gradually reducing the transmission power of the cell; and closing the transmission power of the cell after users in the cell migrate to other cells.

Preferably, the base station waking up the cell includes: the base station receiving indication information from the Self Organizing Network, wherein the indication information is adapted to indicate the base station to wake up the cell; and the base station recovering pilot channel power of a carrier of the cell to be an operation state value.

Preferably, the Self Organizing Network judges whether the cell of the base station requires sleep and/or wakeup according to at least one of the following: load condition of a serving cell and an adjacent cell, the number of attempts of soft handover, and a fixed time period.

Preferably, the Self Organizing Network judging whether the cell of the base station requires sleep and/or wakeup includes: the Self Organizing Network judging whether the cell of the base station requires sleep and/or wakeup by a periodical manner.

Preferably, the Self Organizing Network judging whether the cell of the base station requires sleep and/or wakeup includes: the Self Organizing Network judging whether the cell of the base station requires sleep and/or wakeup by an event triggering manner.

In order to achieve the above aspect, an apparatus for controlling carrier power is also provided according to another aspect of the present invention.

The apparatus for controlling carrier power according to the present invention comprises: a judgment module, adapted to judge whether a cell of a base station requires sleep and/or wakeup; a first indication module, adapted to, in the case that the judgment result of the judgment module is that the cell requires sleep, indicate the base station to make the cell to sleep, so that the base station reduces pilot channel power of a carrier of the cell to zero or closes the carrier, to make the cell to enter an energy-saving state; and a second indication module, adapted to, in the case that the judgment result of the judgment module is that the cell requires wakeup, indicate the base station to wake up the cell, so that the base station recovers the pilot channel power of the carrier of the cell to an operation state value, to make the cell to exit the energy-saving state.

By virtue of the present invention, the method is adopted in which the SON judges whether a cell of a base station requires sleep and/or wakeup and indicates the base station to control carrier power, so as to solve the problem that relatively high costs is caused by adding hardware devices to achieve the energy-saving of the base station in the prior art, thereby achieving the effect of having energy-saving and environment-friendly base station without modifying hardware, and guaranteeing that a user will not drop calls during entering the energy-saving sleep state and guaranteeing that the energy-saving state can be entered or exited rapidly.

BRIEF DESCRIPTION OF THE DRAWINGS

The drawings illustrated herein provide a further understanding of the present invention, and form a part of the present application. The exemplary embodiments of the present invention and the description thereof are used to explain the present invention without unduly limiting the scope of the present invention. In the drawings.

DETAILED DESCRIPTION OF THE EMBODIMENTS

Figure 1:
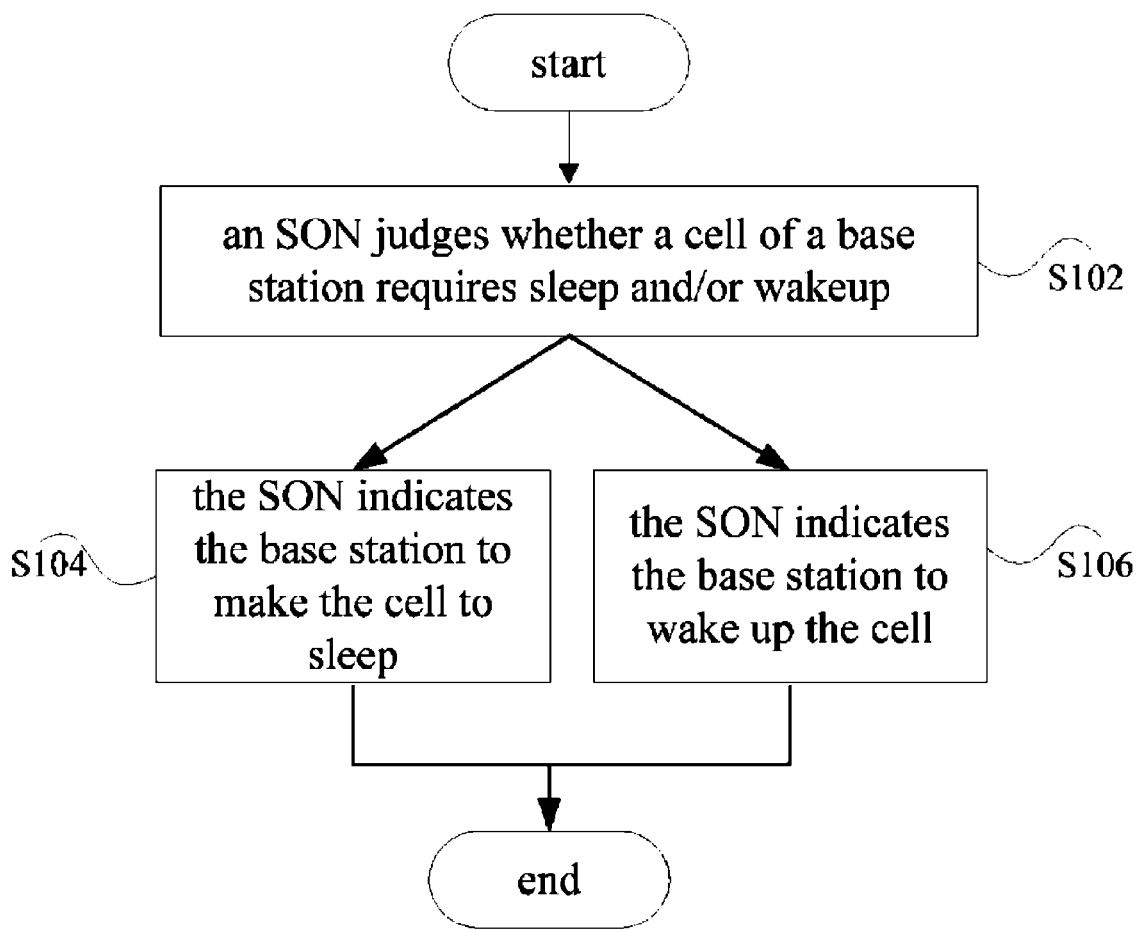
FIG. 1 is a flow chart of a method for controlling carrier power according to an embodiment of the present invention.

Considering the problem that relatively high costs is caused by adding hardware devices to achieve the energy-saving of a base station in the prior art, in the embodiments of the present invention, an SON is used to judge whether a cell of a base station requires sleep and/or wakeup, wherein when the judgment result is that the cell requires sleep, the SON indicates the base station to make the cell to sleep, so that the base station reduces pilot channel power of a carrier of the cell to be zero or closes the carrier, to make the cell enter an energy-saving state; and when the judgment result is that the cell requires wakeup, the SON indicates the base station to wake up the cell, so that the base station recovers the pilot channel power of the carrier of the cell to an operation state value to make the cell exit the energy-saving state.

It needs to be noted that the embodiments of the present application and the features of the embodiments can be combined with each other in the situation of no conflict. The present invention will be described in detail with reference to the drawings and in combination with the embodiments hereinafter.

It needs to be noted that, the steps shown in the flow charts of the drawings can be executed in a computer system such as a set of computer executable instructions, and although the logical order is shown in the flow charts, the steps shown or described can be executed in an order different from that in the flow charts in some circumstances.

A method for cell sleep is provided according to an embodiment of the present invention. The method comprises: a Self Organizing Network judging whether a cell of a base station requires sleep, wherein when the judgment result is that the cell requires sleep, the Self Organizing Network indicates the base station to make the cell to sleep.

Then, the base station makes the cell to sleep by one of the following manners: the base station immediately closing transmission power of the cell; and the base station gradually reducing the transmission power of the cell and closing the transmission power of the cell after users in the cell migrate to other cells; and the base station returning the process result to the Self Organizing Network.

Preferably, the Self Organizing Network judges whether the cell of the base station requires sleep according to at least one of the followings: load condition of a serving cell and an adjacent cell, the number of the attempts of soft handover, and a fixed time period.

Further, the Self Organizing Network judges whether the cell of the base station requires sleep by a periodical manner or an event triggering manner.

A method for cell wakeup is also provided according to an embodiment of the present invention. The method comprises: a Self Organizing Network judging whether a cell of a base station requires wakeup, wherein when the judgment result is that the cell requires wakeup, the Self Organizing Network indicates the base station to wake up the cell.

Then, the base station receives indication information from the Self Organizing Network, wherein the indication information is adapted to indicate the base station to wake up the cell; the base station recovers the cell to the operation state; and the base station returns the process result to the Self Organizing Network.

Preferably, the Self Organizing Network judges whether the cell of the base station requires wakeup according to at least one of the followings: load condition of a serving cell and an adjacent cell, the number of the attempts of soft handover, and a fixed time period.

Preferably, the Self Organizing Network judges whether the cell of the base station requires wakeup by a periodical manner or an event triggering manner.

Preferably, the base station recovering the cell to the operation state comprises the following manner: the base station recovering pilot channel power of a carrier of the cell to the operation state value.

A method for controlling carrier power is provided according to an embodiment of the present invention. FIG. 1 is a flow chart of the method for controlling the carrier power according to the embodiment of the present invention. As shown in FIG. 1, the method comprises the following steps S102 to S106.

Step S102, an SON judges whether a cell of a base station requires sleep and/or wakeup.

Step S104, when the judgment result is that the cell requires sleep, the SON indicates the base station to make the cell to sleep, so that the base station reduces pilot channel power of a carrier of the cell to be zero, or closes the carrier to make the cell enter an energy-saving state, that is, the cell has two states: a normal state and an energy-saving sleep state.

There are two manners for the base station to make the cell to sleep: Manner 1, the base station immediately closes transmission power of the cell, that is, immediately makes the cell to sleep; and Manner 2, the base station gradually reduces the transmission power of the cell, and closes the transmission power of the cell after users in the cell migrate to other cells, that is, friendly makes the cell to sleep. The two manners will be described in detail hereinafter.

Manner I, immediately making the cell to sleep, which in particular includes the following steps:
(1) the SON indicates the base station to immediately make the cell to sleep; and
(2) the base station immediately closes the transmission power of the cell.

Manner II, friendly making the cell to sleep, which in particular includes the following steps:
(1) the SON indicates the base station to friendly make the cell to sleep;
(2) the base station gradually reduces the transmission power of the cell which requires sleep and makes the users in the cell requiring sleep to smoothly migrate to other cells to guarantee that calls (lines) will not be dropped, that is, the base station gradually reduces pilot channel power of a carrier of the cell requiring sleep, and the users at the carrier will be switched to other cells according to the existing mobile strategy due to the gradual weakness of the pilot signal, and those users which newly access the present cell will also be rejected; and
(3) the base station finally closes the transmission power of the cell, that is, the base station makes the cell to sleep (reducing the pilot channel power of the carrier of the cell to be 0 or closing the carrier) after ensuring all the users of the cell have migrated to other cells, so as to guarantee the users will not drop calls (lines).

Step S106, when the judgment result is that the cell requires wakeup, the SON indicates the base station to wake up the cell, so that the base station recovers the pilot channel power of the carrier of the cell to an operation state value to make the cell exit the energy-saving state.

The base station waking up the cell includes: the base station receiving indication information from the SON, wherein the indication information is adapted to indicate the base station to wake up the cell; and the base station recovering the pilot channel power of the carrier of the cell to the operation state value, which in particular includes the following steps:
(1) the SON indicates the base station to wake up the cell; and
(2) the base station wakes up the cell, that is, the base station recovers the pilot channel power of the carrier of the cell to the operation state value.

The SON judges whether the cell of the base station requires sleep and/or wakeup according to at least one of the followings (i.e. a basis of a decision-making algorithm which is based on by the judgment of energy-saving control): load condition of a serving cell and an adjacent cell, the number of the attempts of soft handover, and a fixed time period.

The SON can judge whether a cell of the base station requires sleep and/or wakeup by a periodical manner, and also can judge whether a cell of the base station requires sleep and/or wakeup by an event triggering manner. That is, the SON performs the judgment of the energy-saving control by the periodical manner or by the event triggering manner, wherein the event triggering manner means that it is based on the load condition of a serving cell and an adjacent cell, the number of the attempts of soft handover, and etc; and the periodical manner means that a fixed time period is adopted.

It needs to be noted that the above SON represents a logic entity which implements functions of the SON, which can be implemented on a base station or implemented in a network management system.

By virtue of the present embodiment, the 3GPP SON protocol is added the support for the energy-saving and environment-friendly requirements of the base station, so as to achieve the energy-saving control of the base station. At the same time, the present embodiment can also be suitable to the TDD and the FDD formats and achieve the following effects: the energy-saving and environmental protection of the base station can be achieved without modifying the hardware; it is guaranteed that the base station can enter or exit the energy-saving state rapidly; it is guaranteed that the users will not drop calls (lines) during entering the energy-saving sleep state; and the energy-saving control process of the base station will not cause the deletion and recreation of the cell.

Hereinafter, the implementation processes of the embodiments of the present invention will be described in detail in combination with examples. The SONs in the embodiment 1 and the embodiment 2 represent logic entities achieving the functions of the SON, which can be implemented on a base station (eNodeB) or implemented in a network management system.

Embodiment 1

Figure 2:
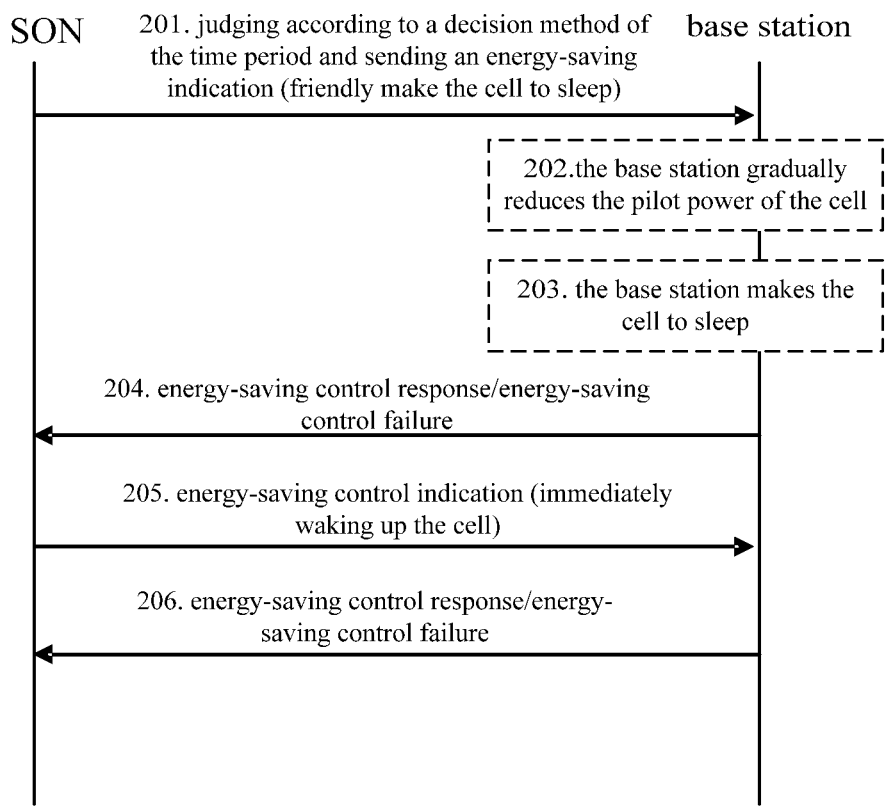
FIG. 2 is a flow chart according to an embodiment 1 of the present invention.

In this embodiment, the SON performs the judgment of the decision algorithm for an energy-saving control according to a time period. The SON uses an energy-saving indication message (ENERGY SAVINGS INDICATION) to carry an energy saving control indication, uses an energy-saving control response message (ENERGY SAVINGS RESPONSE) to represent a successful process, and uses an energy-saving control failure message (ENERGY SAVINGS FAILURE) to represent a failed process. FIG. 2 is a flow chart according to the embodiment 1 of the present invention. As shown in FIG. 2, this flow includes the following steps 201 to 206, wherein steps 201 to 204 are the process of cell sleep, and steps 205 to 206 are the process of cell wakeup.

Step 201, the SON performs an energy-saving control judgment periodically to judge whether an eNodeB cell requires sleep or wakeup according to a decision method of the time period, for example, the cell enters a sleep state during the time period of 22:00-7:00 every day and the cell recovers to the operation state during the other time period, wherein when the SON judges that the sleep condition of the eNodeB cell is met, for example, the current time is 22:00, the SON sends an ENERGY SAVINGS INDICATION to the eNodeB cell to indicate the eNodeB cell to perform sleep energy-saving process.

Step 202, the eNodeB gradually reduces pilot power of the eNodeB cell after receiving the ENERGY SAVINGS INDICATION sent by the SON. The users at carriers of the eNodeB cell will be switched to other cells according to existing mobile strategy due to the gradual weakness of the pilot signal, which ensures the users will not drop calls. Users newly accessing the present cell will also be rejected.

Step 203, after the pilot power of the cell is reduced to a certain value and it is guaranteed that all the users of the cell have migrated to other cells, the eNodeB makes the cell to sleep (reducing the pilot channel power of the carriers of the cell to be 0 or closing the carriers).

Step 204, if the sleep process of the eNodeB cell is successful, then an ENERGY SAVINGS RESPONSE is returned; and if the sleep process is failed, then an ENERGY SAVINGS FAILURE is returned.

Step 205, the SON performs the energy-saving control judgment periodically to judge whether the eNodeB cell requires sleep or wakeup according to the decision method of the time period, for example, the cell enters the sleep state during the time period of 22:00-7:00 every day and the cell recovers to the operation state during the other time period, wherein when the SON judges that the wakeup condition of the eNodeB cell is met, for example, the current time is 7:01, the SON sends an ENERGY SAVINGS INDICATION to the eNodeB cell to indicate the eNodeB cell to perform wakeup recovery process.

Step 206, the eNodeB immediately wakes up the cell after receiving the ENERGY SAVINGS INDICATION sent by the SON, wherein if the wakeup process is successful, an ENERGY SAVINGS RESPONSE is returned; and if the wakeup process is failed, an ENERGY SAVINGS FAILURE is returned.

Embodiment 2

Figure 3:
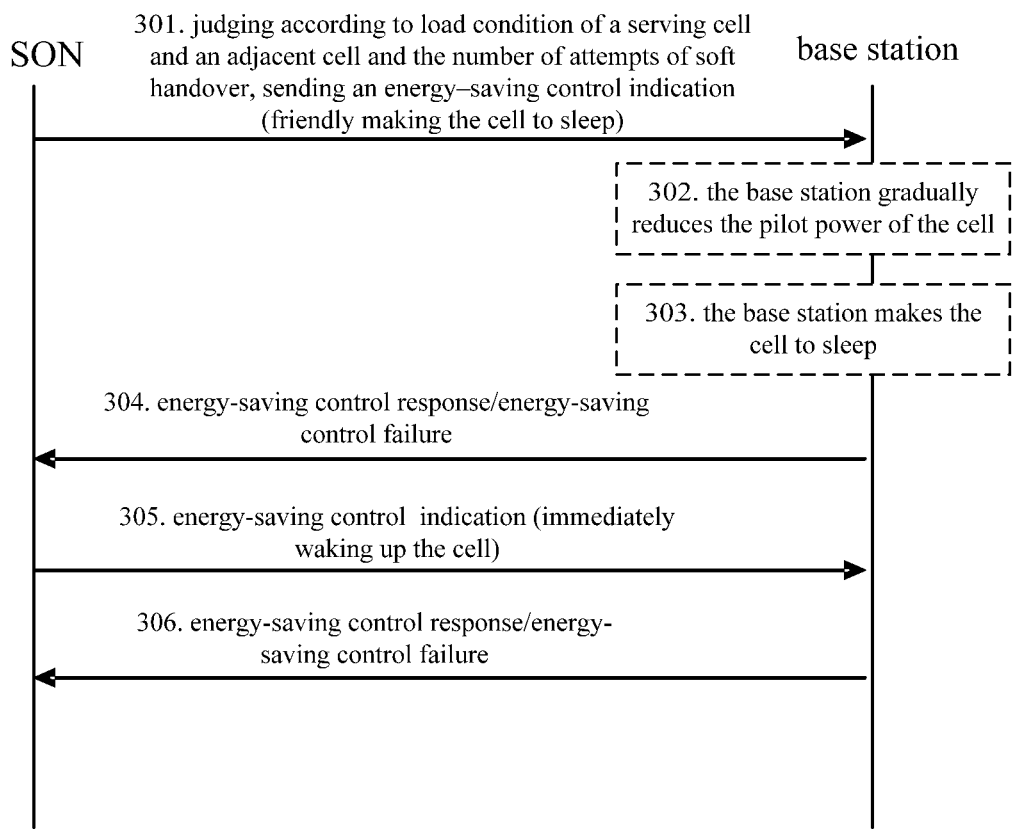
FIG. 3 is a flow chart according to an embodiment 2 of the present invention.

In this embodiment, the SON performs the judgment of the decision algorithm for the energy-saving control according to load condition of a serving cell and an adjacent cell and the number of the attempts of soft handover. The SON uses an energy-saving indication message (ENERGY SAVINGS INDICATION) to carry an energy-saving control indication, uses an energy-saving control response message (ENERGY SAVINGS RESPONSE) to represent a successful process, and uses an energy-saving control failure message (ENERGY SAVINGS FAILURE) to represent a failed process. FIG. 3 is a flow chart according to the embodiment 2 of the present invention. As shown in FIG. 3, this flow includes the following steps 301 to 306, wherein steps 301 to 304 are the process of cell sleep, and steps 305 to 306 are the process of cell wakeup.

Step 301, the SON performs an energy-saving control judgment periodically to judge whether an eNodeB cell requires sleep or wakeup according to load condition of a serving cell and an adjacent cell and the number of attempts of soft handover, for example, when the load of a serving cell to sleep is lower than one certain threshold and the load of an adjacent cell is not higher than one certain threshold, the serving cell enters a sleep state When the eNodeB judges that the sleep condition of the cell is met, the SON sends an ENERGY SAVINGS INDICATION to the eNodeB cell to indicate the eNodeB cell to perform sleep energy-saving process.

Step 302, the eNodeB gradually reduces pilot power of the cell requiring sleep after receiving the ENERGY SAVINGS INDICATION sent by the SON. The users at the carriers of the eNodeB cell will be switched to other cells according to existing mobile strategy due to the gradual weakness of the pilot signal, which thus ensures the users will not drop calls (lines). Users newly accessing the present cell will also be rejected.

Step 303, after the pilot power of the cell is reduced to a certain value and it is guaranteed that all the users of the cell have migrated to other cells, the eNodeB makes the cell to sleep (reducing the pilot channel power of the carriers of the cell to be 0 or closing the carriers).

Step 304, if the sleep process of the eNodeB cell is successful, then an ENERGY SAVINGS RESPONSE is returned; and if the sleep process is failed, then an ENERGY SAVINGS FAILURE is returned.

Step 305, the SON performs the energy-saving control judgment periodically to judge whether the eNodeB cell requires sleep or wakeup according to the load condition of the serving cell and the adjacent cell and the number of the attempts of the soft handover, for example, when the load of an adjacent cell of the sleep cell is higher than one certain threshold or the number of the attempts of the soft handover are higher than one certain threshold, the sleep cell requires wakeup recovery, wherein when it is decided that the wakeup condition of the eNodeB cell is met, the SON sends an ENERGY SAVINGS INDICATION to the eNodeB cell to indicate the eNodeB cell to perform wakeup recovery process.

Step 306, the eNodeB immediately wakes up the cell after receiving the ENERGY SAVINGS INDICATION sent by the SON, wherein if the wakeup process is successful, then an ENERGY SAVINGS RESPONSE is returned; and if the wakeup process is failed, then an ENERGY SAVINGS FAILURE is returned.

Although the present invention is described in combination with particular embodiments, those skilled in the art can make modifications and changes without departing from the spirit or scope of the present invention. Such modifications and changes are considered as falling in the scope of the present invention and the scope of the additional claims.

Figure 4:
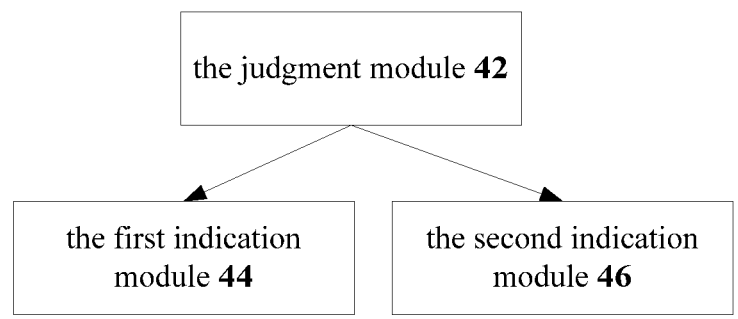
FIG. 4 is a structural block diagram of an apparatus for controlling carrier power according to an embodiment of the present invention.

An apparatus for controlling carrier power is provided according to an embodiment of the present invention. FIG. 4 is a structural block diagram of an apparatus for controlling carrier power according to the embodiment of the present invention. As shown in FIG. 4, the above apparatus comprises: a judgment module 42, a first indication module 44, and a second indication module 46. The structure of the apparatus will be described in detail hereinafter.

The judgment module 42 is adapted to judge whether a cell of a base station requires sleep and/or wakeup. The first indication module 44 is connected to the judgment module 42 and is adapted to, in the case that the judgment result of the judgment module 42 is that the cell requires sleep, indicate the base station to make the cell to sleep, so that the base station reduces pilot channel power of a carrier of the cell to be zero or closes the carrier to make the cell enter an energy-saving state. The second indication module 46 is connected to the judgment module 42 and is adapted to, in the case that the judgment result of the judgment module 42 is that the cell requires wakeup, indicate the base station to wake up the cell, so that the base station recovers the pilot channel power of the carrier of the cell to an operation state value to make the cell exit the energy-saving state.

There are two manners for the base station to make the cell to sleep: manner I, the base station immediately closes the transmission power of the cell, that is, immediately makes the cell to sleep; and manner II, the base station gradually reduces the transmission power of the cell and closes the transmission power of the cell after the users in this cell have migrated to other cells, that is, friendly makes the cell to sleep.

The base station waking up the cell includes: the base station receives indication information from the SON, wherein the indication information is adapted to indicate the base station to wake up the cell; and the base station recovers the pilot channel power of the carrier of the cell to an operation state value.

In summary, the above embodiments achieve the object of the energy-saving and environmental protection of the base station by the manner in which the energy-saving control of the base station is performed by the SON periodically performing the energy-saving control judgment or performing the energy-saving control judgment which is triggered by an event (by means of the measures of making some carriers to sleep or wake up and the like), thus the effect of the energy-saving and environmental protection of the base station can be achieved without changing the hardware. It is guaranteed that the users will not drop calls during entering the energy-saving sleep state, and it is also guaranteed that the performance of entering or exiting the energy-saving state is rapid.

Apparently, those skilled in the art should understand that each module or step of the present invention mentioned above can be implemented through general-purpose computing devices and they can be centralized on single computing devices or distributed on a network consisted of a plurality of computing devices. Optionally, they can be implemented using program code executed by computing device. Therefore, they can be executed by computing devices by storing them in a storage device, or they can be made into single integrated circuit module respectively or they can be implemented by making a plurality of modules or steps of them into a single integrated circuit module. Thus, the present invention is not limited to the combination of any specific hardware and software.

Above description is only to illustrate the preferred embodiments of the present invention rather than limit the present invention. To those skilled in the art, the present invention can have various alterations and changes. Any modification, equivalent substitution and improvement within the spirit and principle of the present invention should be included in the protect scope of the present invention.

What is claimed is:

1. A method for cell sleep, comprising: a Self Organizing Network (SON) judging whether a cell of a base station requires sleep, wherein when the judgment result is that the cell requires sleep, the Self Organizing Network indicates the base station to make the cell to sleep; the base station making the cell to sleep by one of the following manners: the base station immediately closing transmission power of the cell; and the base station gradually reducing the transmission power of the cell and closing the transmission power of the cell after users in the cell migrate to other cells; and the base station returning a process result to the Self Organizing Network.

2. The method according to claim 1, wherein the Self Organizing Network judges whether the cell of the base station requires sleep according to at least one of the following: load condition of a serving cell and an adjacent cell, the number of attempts of soft handover, and a fixed time period.

3. The method according to claim 2, wherein the Self Organizing Network judges whether the cell of the base station requires sleep by a periodical manner or an event triggering manner.

4. The method according to claim 1, wherein the Self Organizing Network judges whether the cell of the base station requires sleep by a periodical manner or an event triggering manner.

5. A method for cell wakeup, comprising: a Self Organizing Network judging whether a cell of a base station requires wakeup, wherein when the judgment result is that the cell requires wakeup, the Self Organizing Network indicates the base station to wake up the cell; the base station receiving indication information from the Self Organizing Network, wherein the indication information is adapted to indicate the base station to wake up the cell; the base station recovering the cell from a closed state to be an operation state; and the base station returning a process result to the Self Organizing Network.

6. The method according to claim 5, wherein the Self Organizing Network judges whether the cell of the base station requires wakeup according to at least one of the following: load condition of a serving cell and an adjacent cell, the number of attempts of soft handover, and a fixed time period.

7. The method according to claim 6, wherein the Self Organizing Network judges whether the cell of the base station requires wakeup by a periodical manner or an event triggering manner.

8. The method according to claim 5, wherein the Self Organizing Network judges whether the cell of the base station requires wakeup by a periodical manner or an event triggering manner.

9. The method according to claim 5, wherein the base station recovering the cell to the operation state comprises the following manner: the base station recovering pilot channel power of a carrier of the cell to an operation state value.

10. A method for controlling carrier power, comprising:
a Self Organizing Network judging whether a cell of a base station requires sleep and/or wakeup,
wherein when the judgment result is that the cell requires sleep, the Self Organizing Network indicates the base station to make the cell to sleep, so that the base station reduces pilot channel power of a carrier of the cell to zero or closes the carrier, to make the cell to enter an energy-saving state; and
when the judgment result is that the cell requires wakeup, the Self Organizing Network indicates the base station to wake up the cell, so that the base station recovers the pilot channel power of the carrier of the cell to an operation state value, to make the cell to exit the energy-saving state.

11. An apparatus for controlling carrier power, comprising:
a judgment module, adapted to judge whether a cell of a base station requires sleep and/or wakeup;
a first indication module, adapted to, in the case that the judgment result of the judgment module is that the cell requires sleep, indicate the base station to make the cell to sleep, so that the base station reduces pilot channel power of a carrier of the cell to zero or closes the carrier, to make the cell to enter an energy-saving state; and a second indication module, adapted to, in the case that the judgment result of the judgment module is that the cell requires wakeup, indicate the base station to wake up the cell, so that the base station recovers the pilot channel power of the carrier of the cell to an operation state value, to make the cell to exit the energy-saving state.

* * * * *